United States Patent
Manabe et al.

(10) Patent No.: US 9,212,837 B2
(45) Date of Patent: Dec. 15, 2015

(54) ADSORPTION-TYPE HEAT PUMP USING SEAT VALVE AND INFORMATION PROCESSING SYSTEM

(71) Applicant: FUJITSU LIMITED, Kawasaki-shi, Kanagawa (JP)

(72) Inventors: Toshio Manabe, Atsugi (JP); Hiroaki Yoshida, Isehara (JP); Noriyasu Aso, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/107,543

(22) Filed: Dec. 16, 2013

(65) Prior Publication Data

US 2014/0102121 A1 Apr. 17, 2014

Related U.S. Application Data

(63) Continuation of application No. PCT/JP2011/064825, filed on Jun. 28, 2011.

(51) Int. Cl.
*F25D 23/12* (2006.01)
*F25B 41/04* (2006.01)
*F25B 17/08* (2006.01)

(52) U.S. Cl.
CPC .............. *F25B 41/04* (2013.01); *F25B 17/083* (2013.01); *Y02B 30/64* (2013.01)

(58) Field of Classification Search
CPC ....... F25B 17/086; F25B 41/04; F25B 17/083
USPC ...................................................... 62/259.2
See application file for complete search history.

(56) References Cited

U.S. PATENT DOCUMENTS 2,463,359 A 3/1949 Daiger
2,587,996 A * 3/1952 Gross .............................. 62/144

(Continued)

FOREIGN PATENT DOCUMENTS

DE 202004016750 U1 3/2005
EP 1416233 A2 5/2004

(Continued)

OTHER PUBLICATIONS

International Search Report; mailed in connection with PCT/JP2011/064825 and mailed Sep. 20, 2011.

(Continued)

*Primary Examiner* — Allen Flanigan
*Assistant Examiner* — Filip Zec
(74) *Attorney, Agent, or Firm* — Fujitsu Patent Center

(57) ABSTRACT

An adsorption-type heat pump includes an adsorber having an adsorbent and capable of switching between an adsorption process of causing an adsorbent to adsorb a refrigerant and a desorption process of desorbing a refrigerant from an adsorbent, a condenser, an evaporator, a first flow hole which causes a refrigerant to flow from the adsorber to the condenser, a second flow hole which causes a refrigerant to flow from the evaporator to the adsorber, and a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole.

9 Claims, 9 Drawing Sheets

(56) References Cited

U.S. PATENT DOCUMENTS

| | | | | |
|---|---|---|---|---|
| 4,586,345 | A | * | 5/1986 | Friberg et al. ............... 62/235.1 |
| 4,623,018 | A | * | 11/1986 | Takeshita et al. ......... 165/104.12 |
| 5,272,891 | A | * | 12/1993 | Erickson ....................... 62/477 |
| 5,666,818 | A | * | 9/1997 | Manrique-Valadez ...... 62/235.1 |
| 6,663,358 | B2 | * | 12/2003 | Loprete et al. ................ 417/313 |
| 2004/0079106 | A1 | | 4/2004 | Maier-Laxhuber et al. |
| 2008/0216508 | A1 | * | 9/2008 | Maier-Laxhuber et al. .... 62/487 |
| 2011/0154842 | A1 | * | 6/2011 | Heydari et al. .............. 62/259.2 |

FOREIGN PATENT DOCUMENTS

| | | |
|---|---|---|
| JP | H06-026727 A | 2/1994 |
| JP | H08-135524 A | 5/1996 |
| JP | H09-152221 A | 6/1997 |
| JP | 2000-257861 A | 9/2000 |
| JP | 2003-278519 A | 10/2003 |
| JP | 2010-151386 A | 7/2010 |

OTHER PUBLICATIONS

CNOA—The First Office Action of Chinese Patent Application No. 201180071927.9, dated Mar. 9, 2015, with English language translation.

EESR—Extended European Search Report issued on Feb. 23, 2015 for European Patent Application No. 11868619.5.

JPOA—Office Action of Japanese Patent Application No. 2013-522392 dated Aug. 26, 2014 with full English translation of the Office Action.

* cited by examiner

F I G.1
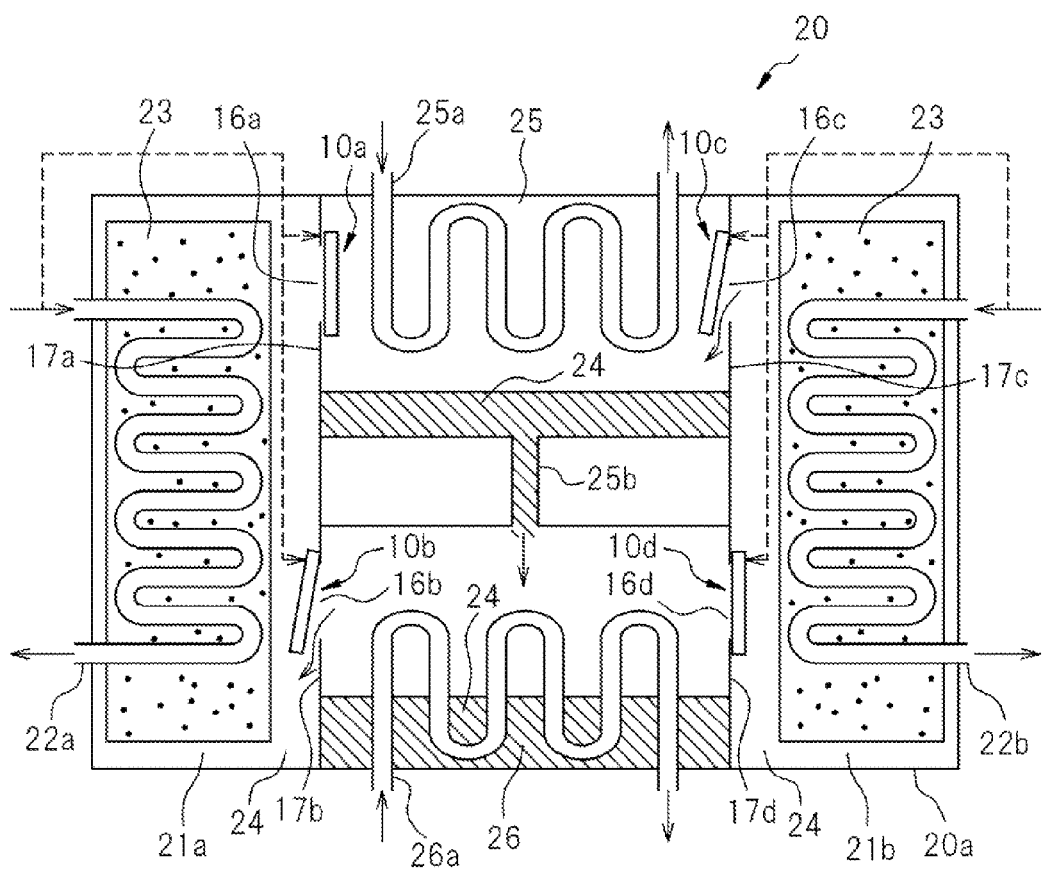

ADSORPTION-TYPE HEAT PUMP USING SEAT VALVE AND INFORMATION PROCESSING SYSTEM

CROSS-REFERENCE TO RELATED APPLICATIONS

This application is a continuation application of the International Patent Application PCT/JP2011/064825, filed on Jun. 28, 2011 in Japan and designating the United States. The entire contents of International Patent Application PCT/JP2011/064825 are incorporated herein by reference.

FIELD

The present invention relates to an adsorption-type heat pump using a seat valve and an information processing system.

BACKGROUND

In order to prevent global warming, etc., the importance of technology for reducing environmental burdens is increasing. Among such technologies, recovering and reusing waste heat, which is conventionally disposed of because of no use value, has attracted attention, one of which is an adsorption-type heat pump.

The adsorption-type heat pump converts thermal energy at temperatures of for example, 100° C. or less into low-temperature heat by utilizing the movement of latent heat produced when a refrigerant, such as water or methanol, is adsorbed by or desorbed from an adsorbent, such as silica gel or active carbon.

The adsorption-type heat pump has an adsorber having an adsorbent and is capable of switching between an adsorption process of causing an adsorbent to adsorb a refrigerant and a desorption process of desorbing a refrigerant from an adsorbent. Further, the adsorption-type heat pump includes a condenser which condenses a refrigerant desorbed from the adsorber and an evaporator which evaporates a refrigerant supplied from the condenser and supplies an evaporated refrigerant to the adsorber.

In the adsorption process, the refrigerant in the liquid phase evaporates within the evaporator, the refrigerant having changed into the gas phase moves into the adsorber and is adsorbed by the adsorbent. At this time, the refrigerant takes the heat of evaporation within the evaporator, and therefore, it is possible to remove low-temperature heat from the evaporator.

In the desorption processes, the refrigerant is desorbed from the adsorbent by heating the adsorbent having adsorbed the refrigerant and the desorbed refrigerant is cooled and condensed within the condenser. The refrigerant having changed into the liquid phase is supplied to the evaporator. High-temperature heat used in the desorption process may be as low as about 60° C. depending on the kind of adsorbent, and therefore, it is possible to utilize the thermal energy of waste heat at various low temperatures as a high-temperature heat source.

By repeating the adsorption process and the desorption process, it is possible to generate low-temperature heat from high-temperature heat.

In the adsorption-type heat pump described above, between the adsorber and the evaporator, a valve is arranged in a flow passage which causes the refrigerant in the gas phase to flow from the evaporator to the adsorber. Further, between the adsorber and the condenser, a valve is arranged in a flow passage which causes the refrigerant in the gas phase to flow from the adsorber to the condenser. These valves check the backflow of the refrigerant.

As such a valve, a seat valve having a valve body in the form of a seat is used. The valve body in the form of a seat is opened and closed by a pressure difference between the adsorber and the evaporator or by a pressure difference between the adsorber and the condenser, and therefore, the structure is simple and no additional driving force for opening and closing the valve body needs to be used.

[Patent Literature 1] Japanese Unexamined Patent Publication (Kokai) No. 9-152221

[Patent Literature 2] Japanese Unexamined Patent Publication (Kokai) No. 8-135524

SUMMARY

However, the valve body in the form of a seat closes a flow hole by using a valve body in the form of a plane, and therefore, if the refrigerant having condensed and changed into the liquid phase sticks to between the valve body and the portion on the periphery of the flow passage, there is a case where it is difficult for the valve body to open because of surface tension.

Further, there is a case where it is difficult for the valve body in the form of a seat to open because of its own weight when the direction in which it opens is the vertically downward direction.

As described above, the conventional seat valve having the valve body in the form of a seat has a problem of the opening and closing operation or responsiveness.

According to an aspect of the embodiment, an adsorption-type heat pump disclosed in the present specification includes: an adsorber having an adsorbent and capable of switching between an adsorption process of causing an adsorbent to adsorb a refrigerant and a desorption process of desorbing a refrigerant from an adsorbent; a condenser which condenses a refrigerant desorbed from the adsorber; an evaporator which evaporates a refrigerant supplied from the condenser and supplies an evaporated refrigerant to the adsorber; a first flow hole which causes a refrigerant to flow from the adsorber to the condenser; a second flow hole which causes a refrigerant to flow from the evaporator to the adsorber; and a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole.

According to an aspect of the embodiment, an information processing system disclosed in the present specification includes an information processing unit which produces heat at the time of operation, a cooling unit to which a heating medium is supplied, and an adsorption-type heat pump having: an adsorber having an adsorbent and capable of switching between an adsorption process of causing an adsorbent to adsorb a refrigerant and a desorption process of desorbing a refrigerant from an adsorbent; a condenser which condenses a refrigerant desorbed from the adsorber; an evaporator which evaporates a refrigerant supplied from the condenser and supplies an evaporated refrigerant to the adsorber; a first flow hole which causes a refrigerant to flow from the adsorber to the condenser; a first flow hole which causes a refrigerant to flow from the evaporator to the adsorber; and a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole, and in the desorption process, the adsorber desorbs a refrigerant from an adsorbent by using produced heat of the information processing unit and in the adsorption process, the evaporator cools the heating medium by using evaporation heat when a refrigerant is evaporated and supplies the cooled heating medium to the cooling unit.

According to an aspect of the embodiment, an operation method of an adsorption-type heat pump disclosed in the present specification is an operation method of an adsorption-type heat pump including: an adsorber having an adsorbent and capable of switching between an adsorption process of causing an adsorbent to adsorb a refrigerant and a desorption process of desorbing a refrigerant from an adsorbent; a condenser which condenses a refrigerant desorbed from the adsorber; an evaporator which evaporates a refrigerant supplied from the condenser and supplies an evaporated refrigerant to the adsorber; a first flow hole which causes a refrigerant to flow from the adsorber to the condenser; a second flow hole which causes a refrigerant to flow from the evaporator to the adsorber; and a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole, and in the desorption process, the adsorber supplies a refrigerant desorbed from an adsorbent to the condenser through the first flow hole and in the adsorption process, the evaporator supplies an evaporated refrigerant to the adsorber through the second flow hole.

According to an aspect of the embodiment, an operation method of an information processing system disclosed in the present specification is an operation method of an information processing system including an information processing unit which produces heat at the time of operation, a cooling unit to which a heating medium is supplied, and an adsorption-type heat pump having: an adsorber having an adsorbent and capable of switching between an adsorption process of causing an adsorbent to adsorb a refrigerant and a desorption process of desorbing a refrigerant from an adsorbent; a condenser which condenses a refrigerant desorbed from the adsorber; an evaporator which evaporates a refrigerant supplied from the condenser and supplies an evaporated refrigerant to the adsorber; a first flow hole which causes a refrigerant to flow from the adsorber to the condenser; a first flow hole which causes a refrigerant to flow from the evaporator to the adsorber; and a seat valve body arranged on at least one of the first flow hole and the second flow hole, having a seat material and an opening and closing assisting plate material joined to an end part of the seat material, and formed by a temperature-dependent material which deforms in accordance with temperature, and opening and closing at least one of the first flow hole and the second flow hole, and in the desorption process, the adsorber desorbs a refrigerant from an adsorbent by using produced heat of the information processing unit and at the same time, the adsorber supplies a refrigerant desorbed from an adsorbent to the condenser through the first flow hole and in the adsorption process, the evaporator supplies an evaporated refrigerant to the adsorber through the second flow hole and at the same time, the evaporator cools the heating medium by using heat of evaporation when a refrigerant is evaporated and supplies the cooled heating medium to the cooling unit.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram depicting a first embodiment of an adsorption-type heat pump disclosed in the present specification.

DESCRIPTION OF EMBODIMENTS

Figure 2:
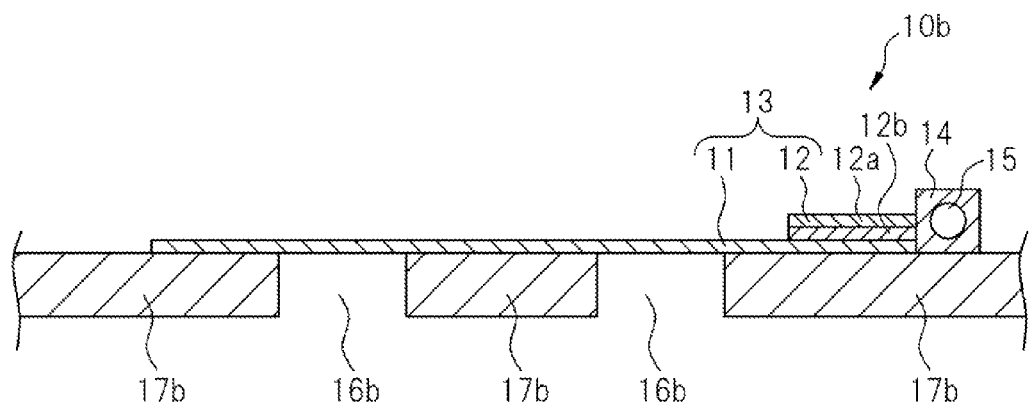
FIG. 2 is an end view depicting a seat valve in a closed state of the adsorption-type heat pump depicted in FIG. 1.

Hereinafter, a preferable first embodiment of an adsorption-type heat pump disclosed in the present specification is illustrated with reference to the drawings. However, the technical scope of the present invention is not limited to the embodiments and includes the invention described in the claims and equivalents thereof.

FIG. 1 is a diagram depicting the first embodiment of an adsorption-type heat pump disclosed in the present specification.

An adsorption-type heat pump 20 of the present embodiment includes a first adsorber 21a and a second adsorber 21b each having an adsorbent 23. The first adsorber 21a and the second adsorber 21b are capable of switching between an adsorption process of causing the adsorbent 23 to adsorb a refrigerant 24 and a desorption process of desorbing the refrigerant 24 from the adsorbent 23. Further, the adsorption-type heat pump 20 includes a condenser 25 which condenses the refrigerant 24 desorbed from the first adsorber 21a or the second adsorber 21b. Furthermore, the adsorption-type heat pump 20 includes an evaporator 26 which evaporates the refrigerant 24 supplied from the condenser 25 and supplies the evaporated refrigerant 24 to the first adsorber 21a or the second adsorber 21b.

The adsorption-type heat pump 20 has a space in which a housing 20a is partitioned into the first adsorber 21a, the second adsorber 21b, the condenser 25, and the evaporator 26. The pressure within the housing 20a is reduced by a vacuum pump etc., not depicted, and a predetermined amount of the refrigerant 24 is sealed in. As the refrigerant 24, for example, water, alcohol, or the like may be used.

Next, the first adsorber 21a and the second adsorber 21b are illustrated further below. The second adsorber 21b has the same structure as that of the first adsorber 21a, and therefore, the illustration of the first adsorber 21a also applies to the second adsorber 21b.

Inside the first adsorber 21a, the adsorbent 23 is arranged. As the adsorbent 23, it is possible to use, for example, silica gel, zeolite, active carbon, etc. The first adsorber 21a has a first heating medium pipe 22a for heating or cooling the adsorbent 23. The first heating medium pipe 22a may be arranged in such a manner that the flow passage meanders so that it is possible to sufficiently provide high-temperature heat or low-temperature heat to the adsorbent 23. To the first heating medium pipe 22a, a high-temperature or low-temperature heating medium is supplied from the outside.

When the first adsorber 21a is in the adsorption process, a low-temperature heating medium is supplied from the outside into the first heating medium pipe 22a and the low-temperature heating medium flows through the first heating medium pipe 22a, thereby cooling the adsorbent 23. The cooled adsorbent 23 has a high adsorbing capacity for the refrigerant 24 in the gas phase.

When the first adsorber 21a is in the desorption process, a high-temperature heating medium is supplied from the outside into the first heating medium pipe 22a and the high-temperature heating medium flows through the first heating medium pipe 22a, thereby heating the adsorbent 23. The heated adsorbent 23 desorbs the adsorbed refrigerant 24 and generates the refrigerant 24 in the gas phase. Further, the adsorbing capacity of the heated adsorbent 23 is regenerated by desorbing the adsorbed refrigerant 24.

As described above, the first adsorber 21a is used by being switched between the adsorption process and the desorption process. The second adsorber 21b is in the desorption process when the first adsorber 21a is in the adsorption process and is in the adsorption process when the first adsorber 21a is in the desorption process. The second adsorber 21b has a second heating medium pipe 22b to which a high-temperature or low-temperature heating medium is supplied from the outside.

The above is the illustration of the first adsorber 21a and the second adsorber 21b.

To the condenser 25, the refrigerant 24 in the gas phase is supplied from the first adsorber 21a or the second adsorber 21b. The condenser 25 has a third heating medium pipe 25a for cooling the refrigerant 24 in the gas phase. The third heating medium pipe 25a may be arranged in such a manner that the flow passage meanders so that it is possible to sufficiently provide low-temperature heat to the refrigerant 24 in the gas phase. To the third heating medium pipe 25a, a low-temperature heating medium is supplied from the outside.

The refrigerant 24 in the gas phase cooled in the condenser 25 changes into the liquid phase. After dropping under the condenser 25, the refrigerant 24 in the liquid phase moves to the evaporator 26 through a conducting pipe 25b. The evaporator 26 is located vertically under the condenser 25 and the refrigerant 24 in the liquid phase moves to the evaporator 26 through the conducting pipe 25b by the gravitational force.

To the evaporator 26, the refrigerant 24 in the liquid phase is supplied from the condenser 25. The evaporator 26 has a fourth heating medium pipe 26a for supplying heat of evaporation when the refrigerant 24 in the liquid phase evaporates. The fourth heating medium pipe 26a may be arranged in such a manner that the flow passage meanders so that it is possible to sufficiently supply heat of evaporation to the refrigerant 24 in the liquid phase. To the fourth heating medium pipe 26a, a heating medium is supplied from the outside and the heating medium cooled in the evaporator 26 is sent to the outside. The refrigerant 24 having changed into the gas phase in the evaporator 26 is supplied to the first adsorber 21a or the second adsorber 21b.

The first adsorber 21a and the condenser 25 are partitioned by a first partition wall 17a. Then, in the first partition wall 17a, a first flow hole 16a which causes the refrigerant 24 to flow from the first adsorber 21a to the condenser 25 is arranged. The first flow hole 16a is formed as a hole which penetrates through the first partition wall 17a partitioning the space into the space on the first adsorber 21a side and the space on the condenser 25 side. Similarly, the first adsorber 21a and the evaporator 26 are partitioned by a second partition wall 17b. Then, in the second partition wall 17b, a second flow hole 16b which causes the refrigerant 24 to flow from the evaporator 26 to the first adsorber 21a is arranged. The second flow hole 16b is formed as a hole which penetrates through the second partition wall 17b partitioning the space into the space on the first adsorber 21a side and the space on the evaporator 26 side.

Similarly, the second adsorber 21b and the condenser 25 are partitioned by a third partition wall 17c. Then, in the third partition wall 17c, a third flow hole 16c which causes the refrigerant 24 to flow from the second adsorber 21b to the condenser 25 is arranged. Similarly, the second adsorber 21b and the evaporator 26 are partitioned by a fourth partition wall 17d. Then, in the fourth partition wall 17d, a fourth flow hole 16d which causes the refrigerant 24 to flow from the evaporator 26 to the second adsorber 21b is arranged.

On the first flow hole 16a, a seat valve 10a which opens and closes the first flow hole 16a is arranged. Similarly, on the second flow hole 16b, a seat valve 10b which opens and closes the second flow hole 16b is arranged. On the third flow hole 16c, a seat valve 10c which opens and closes the third flow hole 16c is arranged. On the fourth flow hole 16d, a seat valve 10d which opens and closes the fourth flow hole 16d is arranged.

Next, the seat valve 10b is illustrated below in detail with reference to FIG. 2 to FIG. 4.

FIG. 2 is an end view depicting the seat valve 10b in the closed state of the adsorption-type heat pump 20 depicted in FIG. 1. FIG. 3 is an end view depicting the seat valve 10b in the open state of the adsorption-type heat pump 20 depicted in FIG. 1. FIG. 4 is a perspective view depicting the seat valve 10b in the open state of the adsorption-type heat pump 20 depicted in FIG. 1.

The seat valve 10b includes a seat valve body 13 having a seat material 11 and an opening and closing assisting plate material 12 joined to an end part of the seat material 11 and formed by a temperature-dependent material which deforms in accordance with temperature. The seat valve body 13 opens and closes the second flow hole 16b.

Figure 4:
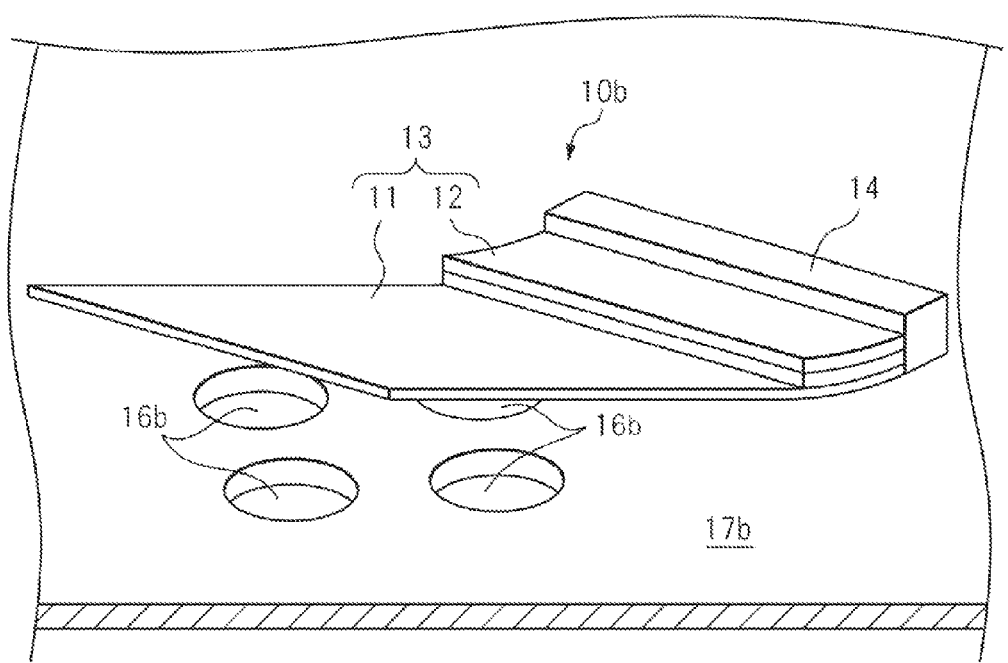
FIG. 4 is a perspective view depicting the seat valve in an open state of the adsorption-type heat pump depicted in FIG. 1.

The seat material 11 has, for example, the shape of a rectangle as depicted in FIG. 4. The opening and closing assisting plate material 12 has, for example, the shape of a longitudinally elongated rectangle as depicted in FIG. 4.

One end part of the seat material 11 is joined to the opening and closing assisting plate material 12. In the present embodiment, one end part of the seat material 11 is stacked on and joined to the opening and closing assisting plate material 12. The other end part of the seat material 11 is a free end part and the seat valve 10b is capable of opening and closing with the opening and closing assisting plate material 12 side of the seat valve body 13 as a fulcrum.

In the state where the seat valve 10b is closed, as depicted in FIG. 2, the seat material 11 is in contact with the surface on the first adsorber 21a side of the second partition wall 17b in such a manner as to cover the second flow hole 16b.

Further, the seat valve 10b includes a heat conduction part which conducts heat to the opening and closing assisting plate material 12. Specifically, in the present embodiment, the heat conduction part causes a heating medium to flow and has a pipe 15 capable of conducting heat to the opening and closing assisting plate material 12. Further, the heat conduction part has a fixing member 14 which fixes the opening and closing assisting plate material 12 on the periphery of the second flow hole 16b on which the seat valve body 13 is arranged.

In the opening and closing assisting plate material 12, the portion including one end part is joined to the seat material 11 and the other end part is fixed on the periphery of the second flow hole 16b via the fixing member 14. The opening and closing assisting plate material 12 is fixed on the surface on the first adsorber 21a side of the second partition wall 17b by using the fixing member 14.

Inside the fixing member 14, the pipe 15 is arranged and the pipe 15 and the opening and closing assisting plate material 12 are thermally coupled via the fixing member 14.

As the forming material of the fixing member 14, one which has a high thermal conductivity is preferable. As the forming material of the fixing member 14, for example, it is possible to use metal, for example, copper.

It is preferable to arrange the pipe 15 in a position close to the opening and closing assisting plate material 12 in order to efficiently transmit high-temperature heat or low-temperature heat of a heating medium flowing through the pipe 15 to the opening and closing assisting plate material 12.

As depicted by the chain line in FIG. 1, to the pipe 15, part of the heating medium flowing through the first heating medium pipe 22a of the first adsorber 21a is supplied. That is, when the first adsorber 21a is in the adsorption process, the low-temperature heating medium for cooling the adsorbent 23 in the adsorption process is supplied to the pipe 15 and when the first adsorber 21a is in the desorption process, the high-temperature heating medium for heating the adsorbent 23 in the desorption process is supplied to the pipe 15.

In the adsorption process of the first adsorber 21a, in the case where the low-temperature heating medium is supplied to the pipe 15, low-temperature heat is transmitted to the opening and closing assisting plate material 12 via the fixing member 14. Further, to the opening and closing assisting plate material 12, low-temperature heat of the evaporated refrigerant is also transmitted. The opening and closing assisting plate material 12 to which low-temperature heat is transmitted deforms so that the seat material 11 opens the second flow hole 16b as depicted in FIG. 3. Specifically, the opening and closing assisting plate material 12 to which low-temperature heat is transmitted deforms so as to bend from the evaporator 26 side toward the first adsorber 21a side As depicted in FIG. 3, by the deformation of the opening and closing assisting plate material 12, the opening operation of the seat valve 10b is assisted by separating at least the portion joined to the opening and closing assisting plate material 12 in the seat material 11 from the second partition wall 17b.

The perspective view of the state where the seat valve 10b is opened in this manner is depicted in FIG. 4. A plurality of the second flow holes 16b having been covered with the seat valve body 13 is exposed to the space on the first adsorber 21a side and it is possible for the refrigerant 24 in the gas phase to flow. In FIG. 1, only one second flow hole 16b is depicted for the sake of simplification.

On the other hand, in the desorption process of the first adsorber 21a, in the case where the high-temperature heating medium is supplied to the pipe 15, high-temperature heat is transmitted to the opening and closing assisting plate material 12 via the fixing member 14. To the opening and closing assisting plate material 12, high-temperature heat of the refrigerant desorbed from the heated adsorbent is also transmitted. The opening and closing assisting plate material 12 to which high-temperature heat is transmitted deforms so that the seat material 11 closes the second flow hole 16b as depicted in FIG. 2. Specifically, the opening and closing assisting plate material 12 to which high-temperature heat is transmitted deforms so as to enter the flat state.

As depicted in FIG. 2, by the opening and closing assisting plate material 12 entering the flat state, the closing operation of the seat valve 10b is assisted by causing at least the portion joined to the opening and closing assisting plate material 12 in the seat material 11 to come into close contact with the surface on the first adsorber 21a side of the second partition wall 17b.

The state where the seat valve 10b is closed in this manner is depicted in FIG. 2. The plurality of the second flow holes 16b is covered with the seat material 11 and it is not possible for the refrigerant 24 in the gas phase to flow.

Next, the forming material etc. of the opening and closing assisting plate material 12 preferable from the viewpoint of making secure the opening and closing operation and improving the responsiveness of the seat valve 10b is illustrated below.

It is preferable to form the opening and closing assisting plate material 12 by stacking a plurality of plate materials having different thermal expansion coefficients. Specifically, as the opening and closing assisting plate material 12, it is possible to use bimetal or trimetal.

Figure 3:
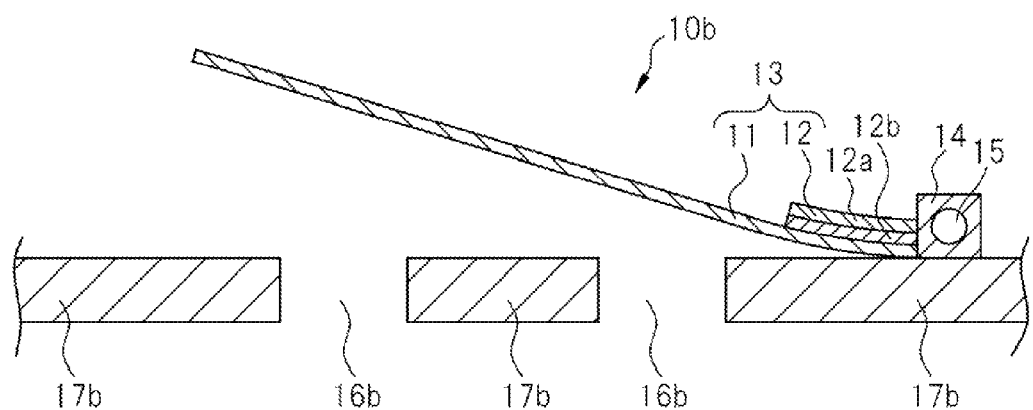
FIG. 3 is an end view depicting the seat valve in an open state of the adsorption-type heat pump depicted in FIG. 1.

As the opening and closing assisting plate material 12 of the seat valve 10b depicted in FIG. 3, an example in which bimetal formed by stacking a plate material 12a and a plate material 12b is depicted. The thermal expansion coefficient of the plate material 12a is larger than the thermal expansion coefficient of the plate material 12b. Consequently, in the opening and closing assisting plate material 12 to which low-temperature heat is transmitted in the adsorption process of the first adsorber 21a, the amount of thermal shrinkage of the plate material 12a is larger than the amount of thermal shrinkage of the plate material 12b, and therefore, the opening and closing assisting plate material 12 deforms so as to bend from the evaporator 26 side toward the first adsorber 21a side.

On the other hand, in the opening and closing assisting plate material 12 to which high-temperature heat is transmitted in the desorption process of the first adsorber 21a, the amount of thermal expansion of the plate material 12a is larger than the amount of thermal expansion of the plate material 12b, and therefore, the opening and closing assisting plate material 12 deforms into the flat state from the state of bending from the evaporator 26 side toward the first adsorber 21a side. The opening and closing assisting plate material 12 may deform so as to bend from the first adsorber 21a side toward the evaporator 26 side, skipping the flat state.

It is preferable for the opening and closing assisting plate material 12 to have a linear relationship between temperature and amount of displacement in the temperature range defined by low-temperature heat or high-temperature heat supplied from the pipe 15. Further, it is preferable for the amount of displacement caused by a predetermined temperature difference to be large.

In the case where the flat plate-shaped bimetal is used as the opening and closing assisting plate material 12, it is preferable for the bending coefficient to be $10 \times 10^{-6}$ (° $C.^{-1}$) or more, in particular, $20 \times 10^{-6}$ (° $C.^{-1}$) or more. The amount of displacement of the flat plate-shaped bimetal is given as $D=K(T_2-T_1)l^2/t$. Here, K is the bending coefficient, $T_2$ and $T_1$ are temperatures before and after displacement, l is the length of the flat plate-shaped bimetal, and t is the thickness of the flat plate-shaped bimetal.

For example, in the case where t is 0.1 mm, l is 20 mm, and $T_2-T_1$ is 25° C., if the bending coefficient K is $10 \times 10^{-6}$ (° $C.^{-1}$) or more, the amount of displacement D equal to or larger than 1 mm is obtained.

As such a flat plate-type bimetal, for example, mention is made of one denoted by the JIS symbol TM1 or TM2. The above is the illustration relating to the preferable forming material etc. of the opening and closing assisting plate material 12.

It is preferable to make the timing at which the high-temperature heating medium or the low-temperature heating medium is caused to flow through the pipe 15 the same as the timing at which the heating medium is caused to flow through the first heating medium pipe 22a of the first adsorber 21a from the viewpoint of improving the responsiveness of the opening and closing operation of the seat valve 10b by quickly deforming the opening and closing assisting plate material 12. Further, it may also be possible to further improve the responsiveness of the opening and closing operation of the seat valve 10b by making the timing at which the high-temperature heating medium or the low-temperature heating medium is caused to flow through the pipe 15 earlier than the timing at which the heating medium is caused to flow through the first heating medium pipe 22a of the first adsorber 21a.

The seat valve 10b having the above-described structure opens so as to allow the flow of the refrigerant 24 in the gas phase from the evaporator 26 to the first adsorber 21a, however, the seat valve 10b closes and does not allow the flow from the first adsorber 21a to the evaporator 26. This operation of the seat valve 10b is illustrated below.

In the adsorption process, when the cooled adsorbent 23 within the first adsorber 21a adsorbs the refrigerant 24 in the gas phase within the first adsorber 21a, the inner pressure of the first adsorber 21a becomes lower than that of the evaporator 26. That is, the inner pressure of the evaporator 26 becomes higher than that of the first adsorber 21a. Then, the seat valve 10b opens toward the first adsorber 21a side in response to a rise in the inner pressure of the evaporator 26 relative to that of the first adsorber 21a. At this time, by the action of the opening and closing assisting plate material 12, the opening operation of the seat valve 10b is assisted, and therefore, the responsiveness of the operation is improved. In this manner, the flow of the refrigerant 24 in the gas phase from the evaporator 26 to the first adsorber 21a is allowed.

On the other hand, in the desorption process, the heated adsorbent 23 within the first adsorber 21a desorbs the adsorbed refrigerant 24, and therefore, the inner pressure of the first adsorber 21a becomes higher than that of the evaporator 26. Then, the seat valve 10b closes toward the evaporator 26 side in response to a rise in the inner pressure of the first adsorber 21a relative to that of the evaporator 26. At this time, by the action of the opening and closing assisting plate material 12, the closing operation of the seat valve 10b is assisted, and therefore, the responsiveness of the closing operation is improved. Because the end part on the vertically upper side of the seat valve body 13 of the seat valve 10b is fixed on the second partition wall 17b, the closing operation of the seat valve 10b is assisted also by its own weight. Consequently, the flow of the refrigerant 24 in the gas phase from the first adsorber 21a to the evaporator 26 is not allowed.

Next, the forming material etc. of the seat material 11 preferable from the viewpoint of making secure the opening and closing operation of the seat valve 10b and improving the responsiveness is illustrated below.

As the forming material of the seat material 11, any material which prevents the refrigerant 24 in the gas phase from passing through may be used without particular restrictions. As the forming material of the seat material 11, for example, it is possible to use a plastic film seat or silicone seat. As the material of plastic, for example, it is possible to use PVA (polyvinyl alcohol), PVC (polyvinyl chloride, PET (polyethylene terephthalate), etc.

The modulus of rigidity or the modulus of elasticity of the seat material 11 may be low or high. In particular, it is preferable for the seat material 11 to have the modulus of rigidity or the modulus of elasticity in a degree in which the whole of the seat material 11 or the portion joined to the opening and closing assisting plate material 12 in the seat material 11 separates from the surface on the first adsorber 21a side of the second partition wall 17b following the deformation of the opening and closing assisting plate material 12 when the opening and closing assisting plate material 12 deforms. Further, in the case where the seat valve body 13 is arranged so as to open in the vertically downward direction, it is preferable to use the seat material 11 having a high modulus of rigidity in order to make secure the opening and closing of the second flow hole 16b.

It is preferable for the seat material 11 to be thin from the viewpoint of securing the opening and closing operation with excellent responsiveness by a pressure difference. It is possible to set the thickness of the seat material 11 to, for example, 0.2 to 0.5 mm.

Next, the seat valve 10a arranged on the first flow hole 16a is illustrated below.

One end part of the seat valve body 13 of the seat valve 10a is fixed on the surface on the condenser 25 side at the first partition wall 17a and the seat valve body 13 is made capable of opening and closing with the opening and closing assisting plate material 12 side as a fulcrum.

The seat valve 10a opens when the first adsorber 21a is in the desorption process and closes when the first adsorber 21a is in the adsorption process.

The structure of the seat valve 10a is the same as that of the seat valve 10b described above except in that the direction in which the seat valve 10a deforms in accordance with temperature of the opening and closing assisting plate material 12 is opposite. This is illustrated below.

As depicted by the chain line in FIG. 1, to the pipe 15 of the seat valve 10a also, part of the heating medium supplied to the first heating medium pipe 22a of the first adsorber 21a is supplied.

That is, when the first adsorber 21a is in the adsorption process, the low-temperature heating medium for cooling the adsorbent 23 in the adsorption process is supplied to the pipe 15 and the opening and closing assisting plate material 12 to which low-temperature heat is transmitted becomes flat so that the seat material 11 closes the first flow hole 16a. In the adsorption process, the inner pressure of the first adsorber 21a becomes lower than that of the condenser 25. Consequently, the seat valve 10a receives a pressure difference so that the seat material 11 closes the first flow hole 16a. As a result, the opening and closing assisting plate material 12 of the seat valve 10a deforms so as to assist the closing operation of the seat material 11. In this manner, the first adsorber 21a and the condenser 25 in the adsorption process are separated by the seat valve 10a.

On the other hand, when the first adsorber 21a is in the desorption process, the high-temperature heating medium for heating the adsorbent 23 in the desorption process is supplied to the pipe 15 of the seat valve 10a and the opening and closing assisting plate material 12 to which high-temperature heat is transmitted deforms so that the seat material 11 opens the first flow hole 16a. In the desorption process, the inner pressure of the first adsorber 21a becomes higher than that of the condenser 25. Consequently, the seat valve 10a receives a pressure difference so that the seat material 11 opens the flow hole 16a. As a result, the opening and closing assisting plate material 12 of the seat valve 10a deforms so as to assist the opening operation of the seat material 11. In this manner, the refrigerant 24 desorbed from the adsorbent 23 of the first adsorber 21a moves to the condenser 25 through the flow hole 16a.

The seat valve 10a having the above-described structure is configured to open so as to allow the flow of the refrigerant 24 in the gas phase from the first adsorber 21a to the condenser 25 but to close to prevent the flow from the condenser 25 to the first adsorber 21a.

The operation of the above-described seat valve 10a is illustrated below by taking the case as an example, where the opening and closing assisting plate material 12 of the seat valve 10a is formed by using the bimetal in which the plate material 12a and the plate material 12b are stacked as in the case of the opening and closing assisting plate material 12 of the seat valve 10b depicted in FIG. 2 and FIG. 3. In the opening and closing assisting plate material 12 of the seat valve 10a, the plate material 12a is arranged on the condenser 25 side and the plate material 12b is arranged on the first adsorber 21a side.

In the seat valve 10a, the thermal expansion coefficient of the plate material 12b is larger than the thermal expansion coefficient of the plate material 12a. Consequently, in the desorption process of the first adsorber 21a, in the opening and closing assisting plate material 12 to which high-temperature heat is transmitted, the amount of thermal expansion of the plate material 12b is larger than the amount of thermal expansion of the plate material 12a, and therefore, the opening and closing assisting plate material 12 deforms so as to bend from the first adsorber 21a side toward the condenser 25 side. In this manner, the opening and closing assisting plate material 12 to which high-temperature heat is transmitted deforms so that the seat material 11 opens the first flow hole 16a.

On the other hand, in the adsorption process of the first adsorber 21a, in the opening and closing assisting plate material 12 of the seat valve 10a to which low-temperature heat is transmitted, the amount of thermal shrinkage of the plate material 12b is larger than the amount of thermal shrinkage of the plate material 12a, and therefore, the opening and closing assisting plate material 12 deforms into the flat state from the state of bending from the first adsorber 21a side toward the condenser 25 side. It may also be possible for the opening and closing assisting plate material 12 to deform so as to bend from the condenser 25 side toward the first adsorber 21a side, skipping the flat state. In this manner, the opening and closing assisting plate material 12 to which low-temperature heat is transmitted deforms so that the seat material 11 closes the first flow hole 16a.

As described above, the relationship in magnitude of the thermal expansion coefficient between the plate material 12a and the plate material 12b of the opening and closing assisting plate material 12 in the seat valve 10a is opposite to that of the opening and closing assisting plate material 12 of the seat valve 10b.

In the present embodiment, by making opposite the directions in which the opening and closing assisting plate materials 12 of the seat valve 10a and the seat valve 10b deform in accordance with temperature, it is made possible to share part of the heating medium supplied to the first heating medium pipe 22a of the first adsorber 21a. Due to this, there is no longer necessity to supply part of the heating medium supplied to the second heating medium pipe 22b of the second adsorber 21b to the seat valve 10a or the seat valve 10b, and therefore, it is possible to reduce the length of the pipe which causes the heating medium to flow. If the directions in which the opening and closing assisting plate materials 12 of the seat valve 10a and the seat valve 10b deform in accordance with temperature are the same, there arises necessity to supply the high-temperature heating medium to one of the seat valve 10a and the seat valve 10b and to supply the low-temperature heating medium to the other. Consequently, there arises necessity to supply part of the heating medium supplied to the second heating medium pipe 22b of the second adsorber 21b to the seat valve 10a or the seat valve 10b.

The structure and working of the seat valve 10c arranged on the third flow hole 16c are the same as those of the seat valve 10a described above. Further, the structure and working of the seat valve 10d arranged on the fourth flow hole 16d are the same as those of the seat valve 10b described above.

Next, an example of the operation of the adsorption-type heat pump 20 described above is illustrated below.

The adsorption-type heat pump 20 continuously takes out low-temperature heat by the cycle processing to alternately switch the adsorption process and the desorption process by using the first adsorber 21a and the second adsorber 21b.

First, as a certain cycle, as depicted in FIG. 1, the adsorption process is performed in the first adsorber 21a upon receipt of the supply of the refrigerant 24 evaporated from the evaporator 26 and at the same time, the refrigerant 24 desorbed by performing the desorption process in the second adsorber 21b is supplied to the condenser 25 and condensed therein. In the next cycle, the process in the first adsorber 21a and the process in the second adsorber 21b are switched and the desorption process is performed in the first adsorber 21a and at the same time, the adsorption process is performed in the second adsorber 21b. That is, in the first adsorber 21a, the refrigerant 24 adsorbed by the adsorbent 23 in the previous cycle is desorbed and supplied to the condenser 25 and in the second adsorber 21b, the adsorbent 23 caused to perform desorption in the previous cycle is caused to adsorb the refrigerant 24 from the evaporator 26.

At this time, accompanying the adsorption process and the desorption process, the low-temperature heating medium and the high-temperature heating medium are supplied alternately to the first adsorber 21a. Further, accompanying the desorption process and the adsorption process, the high-temperature heating medium and the low-temperature heating medium are supplied alternately to the second adsorber 21b.

By repeating such cycles alternately, in the evaporator 26, the heat of evaporation accompanying the change of the refrigerant 24 from the liquid phase into the gas phase is absorbed continuously from the heating medium flowing through the fourth heating medium pipe 26a. By using the heating medium cooled in this manner, low-temperature heat is taken out from the adsorption-type heat pump 20.

In the repetition of such cycles, the seat valves 10a, 10b, 10c, and 10d are driven only by the pressure difference and supply of the heating medium to the pipe 15, and therefore, there is no necessity for energy from the outside to control and drive the seat valve.

The switching between the adsorption process and the desorption process for each adsorber is controlled by switching the low-temperature heating medium and the high-temperature heating medium supplied to each heating medium pipe. Normally, the adsorption process takes a longer time than the desorption process, and therefore, the switching is controlled based on the time taken by the adsorption process. The timing of switching of the heating media is obtained in advance by investigating how much time is taken for the adsorption process to be completed and for the cooling capacity of the evaporator to stop when causing a low-temperature heating medium at a certain temperature to flow. Then, the switching of the heating media is controlled based on the investigated time.

According to the adsorption-type heat pump of the present embodiment described above, the seat valve body opens and closes the flow hole without fail with the assistance of the working of the opening and closing assisting plate material. Further, the responsiveness of the opening and closing operation of the seat valve body improves with the assistance of the working of the opening and closing assisting plate material. Consequently, because there is no longer a failure or delay in opening and closing of the seat valve, the seat valve quickly opens and closes accompanying a produced pressure difference and causes the refrigerant in the gas phase to flow through the flow hole with no delay from the produced pressure difference, and therefore, the heat exchange efficiency of the adsorption-type heat pump improves.

Further, in the seat valve, the opening and closing operation is assisted by the working of the opening and closing assisting plate material, and therefore, even in the case where the seat valve body opens vertically downward, it is possible to close the seat valve body vertically upward without fail. Consequently, the degree of freedom of the position where the seat valve is arranged or the direction increases, and therefore, it is made possible to further reduce the dimensions of the adsorption-type heat pump. It is particularly preferable to use the above-described seat valve with high efficiency in a compact adsorption-type heat pump from the viewpoint of thermal efficiency.

It is possible to mount the adsorption-type heat pump of the present embodiment described above widely on middle-sized and compact devices which produce low-temperature waste heat, for example, vehicles such as automobiles, information processing devices such as computers, etc. By doing so, it is possible to achieve energy saving or a reduction in environmental burdens by utilizing waste heat.

Next, another embodiment of the seat valve which may be used in the adsorption-type heat pump described above is illustrated below with reference to FIG. 5 and FIG. 6. To the points not illustrated in particular in the other embodiment of the seat valve, the detailed illustration of the embodiment described above is applied appropriately. Further, the same symbols are attached to the same components.

Figure 5A:
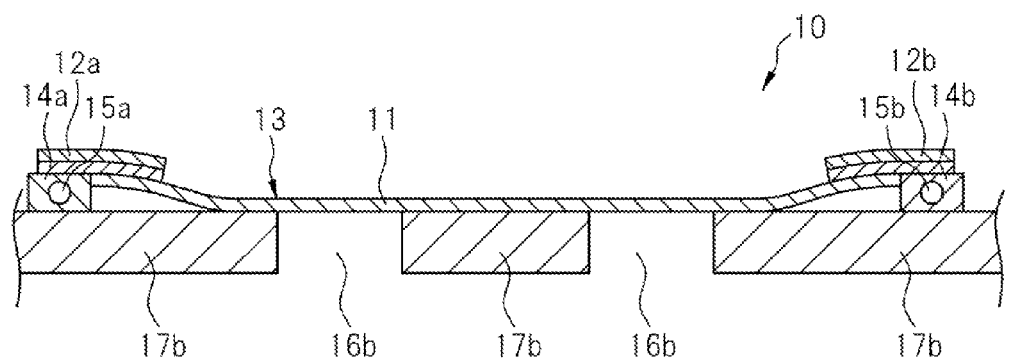
FIG. 5A is an end view depicting a closed state in another embodiment of a seat valve disclosed in the present specification.
Figure 5B:
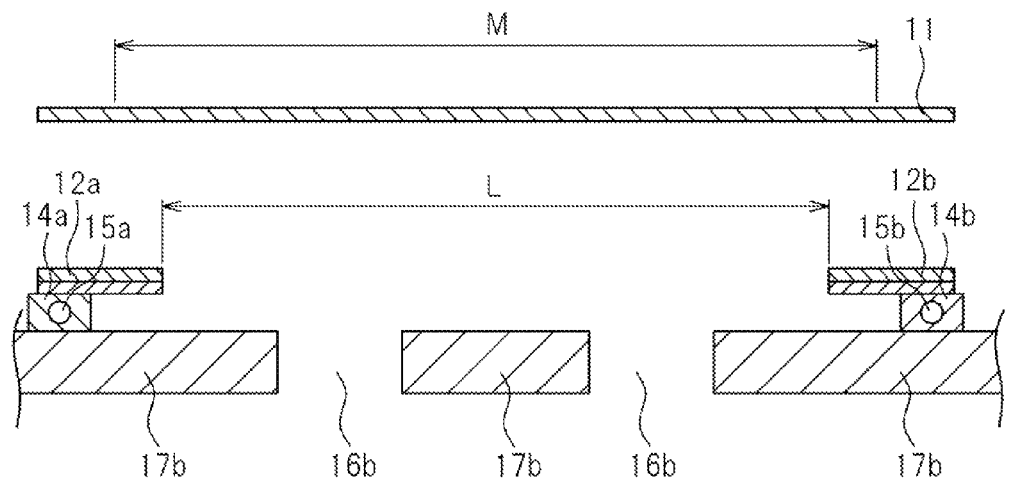
FIG. 5B is a diagram depicting a state where a seat material separated from the seat valve has become flat.
Figure 6:
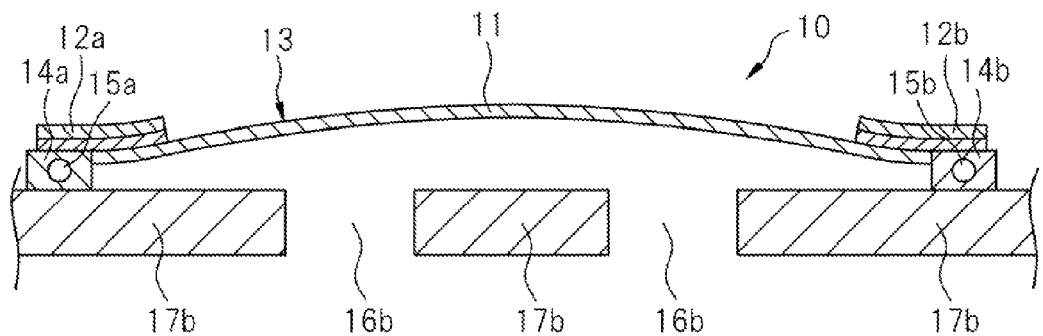
FIG. 6 is an end view depicting an open state of the seat valve depicted in FIG. 5A.

In the illustration using FIG. 5 and FIG. 6, an example is depicted in which the seat valve of the present embodiment is arranged on the second flow hole of the adsorption-type heat pump depicted in FIG. 1.

FIG. 5A is an end view depicting a closed state of the other embodiment of the seat valve disclosed in the present specification and FIG. 5B is a diagram depicting a state where a seat material separated from the seat valve has become flat. FIG. 6 is an end view depicting an open state of the seat valve depicted in FIG. 5A.

In the seat valve 10b of the present embodiment, the seat valve body 13 includes the two opening and closing assisting plate materials 12a and 12b. The seat material 11 is arranged so as to cover the second flow hole 16b. One end part of the seat material 11 is joined to the opening and closing assisting plate material 12a, one of the two opening and closing assisting plate materials 12a and 12b, and the other end part of the seat material 11 is joined to the other opening and closing assisting plate material 12b.

In the present embodiment, one end part of the seat material 11 is stacked on and joined to the surface on the second partition wall 17b side of the one opening and closing assisting plate material 12a. Similarly, the other end part of the seat material 11 is stacked on and joined to the surface on the second partition wall 17b side of the other opening and closing assisting plate material 12b.

In the one opening and closing assisting plate material 12a, the portion including one end part is joined to the seat material 11 and the portion including the other end part is fixed on the periphery of the second flow hole 16b via a fixing member 14a. Specifically, the one opening and closing assisting plate material 12a is fixed on the surface on the first adsorber 21a side of the second partition wall 17b by using the fixing member 14a.

Similarly, in the other opening and closing assisting plate material 12b, the portion including one end part is joined to the seat material 11 and the portion including the other end part is fixed on the periphery of the second flow hole 16b via a fixing member 14b. Specifically, the other opening and closing assisting plate material 12b is fixed on the surface on the first adsorber 21a side of the second partition wall 17b by using the fixing member 14b.

To pipes 15a and 15b arranged within the fixing members 14a and 14b, part of the heating medium supplied to the first heating medium pipe 22a is supplied.

The one opening and closing assisting plate material 12a joined to the fixing member 14a is fixed on the portion of the second partition wall 17b on the periphery of the second flow hole 16b in the state of being separated from the second partition wall 17b. The portion on the one end part side of the seat material 11 is also separated from the second partition wall 17b.

Similarly, the other opening and closing assisting plate material 12b joined to the fixing member 14b is fixed on the portion of the second partition wall 17b on the periphery of the second flow hole 16b in the state of being separated from the second partition wall 17b. The portion on the other end part side of the seat material 11 is also separated from the second partition wall 17b.

As depicted in FIG. 5B, in the seat valve body 13, a length M of the portion of the seat material 11 located between the one opening and closing assisting plate material 12a and the other opening and closing assisting plate material 12b in the state where the seat material 11 is developed into the flat state is greater than a distance L between the one opening and closing assisting plate material 12a and the other opening and closing assisting plate material 12b.

Consequently, in the state where the seat valve 10 is closed, as depicted in FIG. 5A, the seat valve body 13 has a shape bending from the first adsorber 21a side toward the evaporator 26 side as a whole by the pressure difference between the first adsorber 21a and the evaporator 26. A plurality of the second flow holes 16b is covered with the seat valve body 13 and it is not possible for the refrigerant 24 in the gas phase to flow.

In the state where the seat valve 10b is closed, the one opening and closing assisting plate material 12a is deformed so as to bend from the first adsorber 21a side toward the evaporator 26 side. Similarly, the other opening and closing assisting plate material 12a is also deformed so as to bend in the concave form from the first adsorber 21a side toward the evaporator 26 side. The deformation like this of the one and the other opening and closing assisting plate materials 12a and 12b is caused when the high-temperature heating medium is supplied to the pipe 15 and high-temperature heat is transmitted to the one and the other opening and closing assisting plate materials 12a and 12b via the fixing members 14a and 14b in the desorption process of the first adsorber 21a.

By the deformation of the one and the other opening and closing assisting plate materials 12a and 12b as described above, the portion on the side joined to the opening and closing assisting plate material 12 in the seat material 11 is caused to come into close contact with the surface on the first adsorber 21a side of the second partition wall 17b, thereby assisting the closing operation of the seat valve 10b.

On the other hand, in the state where the seat valve 10b is open, as depicted in FIG. 6, the seat valve body 13 has a shape bending from the evaporator 26 side toward the first adsorber 21a side as a whole by the pressure difference between the first adsorber 21a and the evaporator 26. The plurality of the second flow holes 16b covered with the seat valve body 13 are exposed into the space on the first adsorber 21a side and it is made possible for the refrigerant 24 in the gas phase to flow.

Further, in the state where the seat valve 10b is open, the one opening and closing assisting plate material 12a is deformed so as to bend in the convex form from the evaporator 26 side toward the first adsorber 21a side. Similarly, the other opening and closing assisting plate material 12b is also deformed so as to bend from the evaporator 26 side toward the first adsorber 21a side. The deformation like this of the one and the other opening and closing assisting plate materials 12a and 12b is caused when the low-temperature heating medium is supplied to the pipe 15 and low-temperature heat is transmitted to the one and the other opening and closing assisting plate materials 12a and 12b via the fixing members 14a and 14b in the adsorption process of the first adsorber 21a.

By the deformation of the one and the other opening and closing assisting plate materials 12a and 12b as described above, the portion on the side joined to the opening and closing assisting plate material 12 in the seat material 11 is separated from the surface on the first adsorber 21a side of the second partition wall 17b, thereby assisting the opening operation of the seat valve 10b.

It is preferable to set the distance L and the length M described above to dimensions with which creases etc. are not produced in the seat material 11 when the seat valve 10b is closed and it is possible to close the second flow hole 16b.

It is preferable for the seat material 11 to have elasticity in order to cause the seat valve 10b to perform the opening and closing operation without fail and to improve the responsiveness of the operation. If the seat material 11 has elasticity, the seat material 11 deforms by utilizing the inner stress of the seat material 11 in addition to the pressure difference, and therefore, the closed state or the open state of the seat valve body 13 becomes stable. Further, if the seat material 11 has elasticity, the seat material 11 deforms by utilizing the inner stress of the seat material 11 in addition to the pressure difference, and therefore, the time taken by the seat valve 10b to open and close is reduced.

It is possible to set the modulus of elasticity of the seat material 11 so that the seat valve 10b opens and closes by taking into consideration the pressure difference and the amount of deformation of the opening and closing assisting plate materials 12a and 12b. For example, in the state where the pressure difference is exerted on the seat valve 10b, it is possible to do settings so that the direction of deformation of the seat valve body 13 reverses when the amount of deformation of the one and the other opening and closing assisting plate materials 12a and 12b becomes beyond a predetermined range.

The seat valve of the present embodiment described above is illustrated by taking the case where it is arranged on the second flow hole of the adsorption-type heat pump depicted in FIG. 1 as an example. It is possible to similarly arrange the seat valve of the present embodiment also on the third flow hole of the adsorption-type heat pump depicted in FIG. 1. Further, it is also possible to arrange the seat valve of the present embodiment on the second flow hole and on the fourth flow hole of the adsorption-type heat pump depicted in FIG. 1. In this case, the structure of the seat valve will be such that the direction in which the opening and closing assisting plate material 12 deforms in accordance with temperature is opposite.

According to the seat valve of the present embodiment described above, both end parts of the seat valve body 13 are fixed, and therefore, the opening and closing operation is performed without fail even if the opening and closing direction of the seat valve body 13 is vertically upward or downward.

Next, a second embodiment of the adsorption-type heat pump described above is illustrated below with reference to FIG. 7 and FIG. 8. To the points not illustrated in particular in the second embodiment, the detailed illustration of the first embodiment described above is applied appropriately. Further, the same symbols are attached to the same components.

Figure 7:
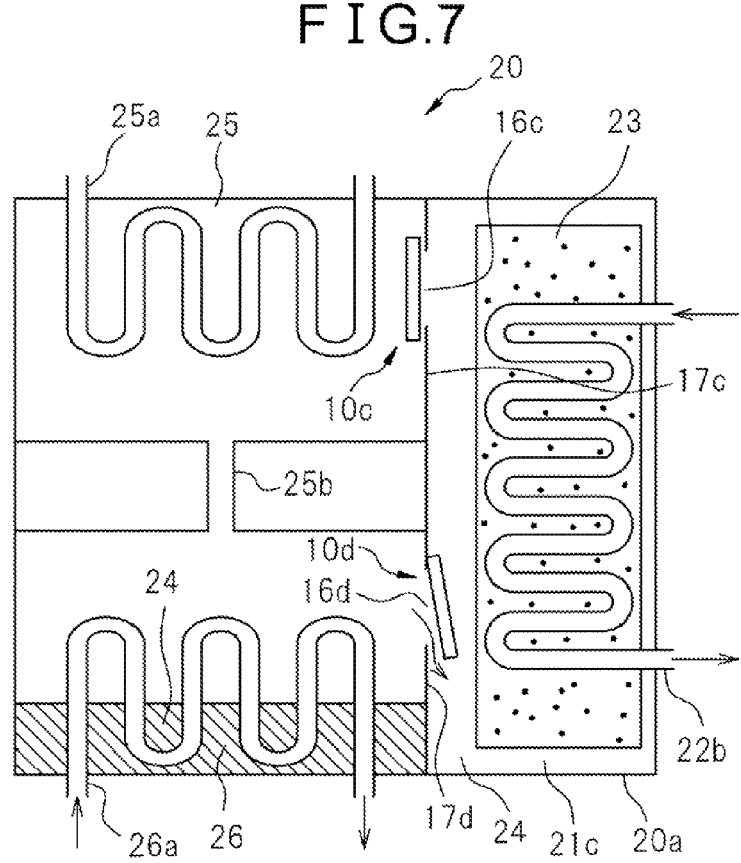
FIG. 7 is a diagram depicting a second embodiment of an adsorption-type heat pump disclosed in the present specification.
Figure 8:
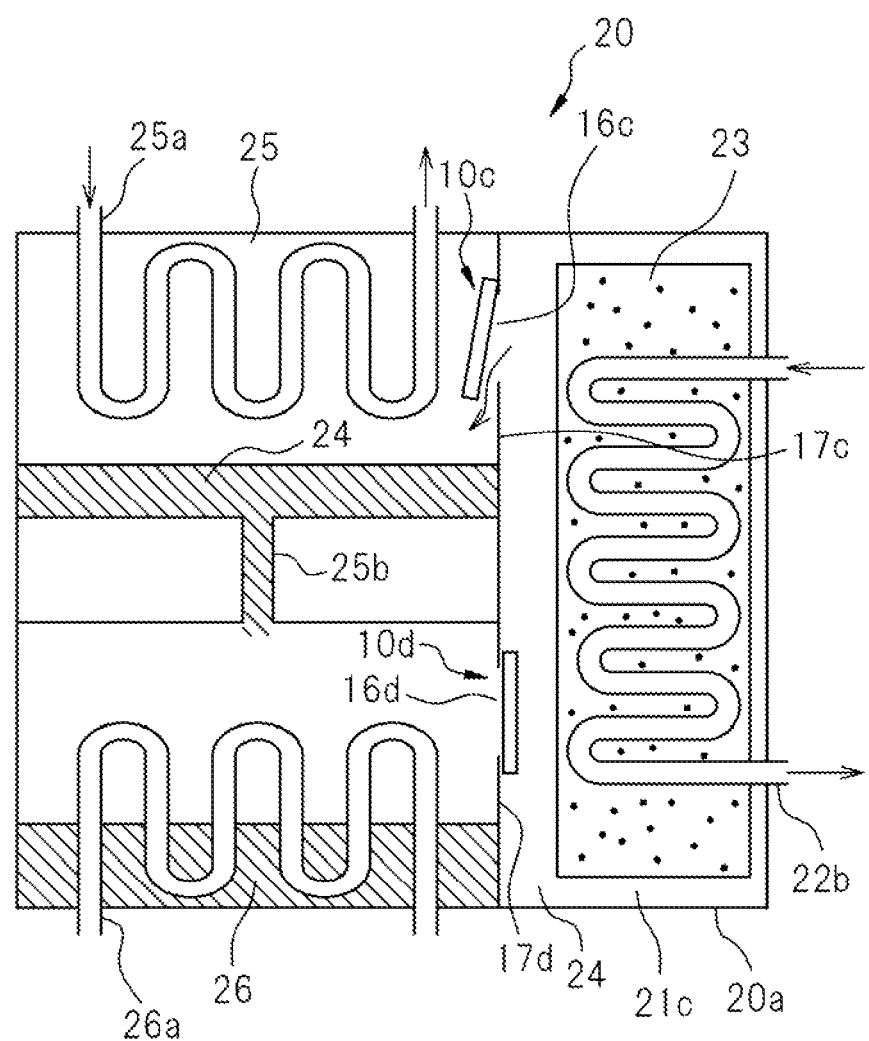
FIG. 8 is a diagram depicting a desorption process of the adsorption-type heat pump depicted in FIG. 7.

FIG. 7 is a diagram depicting the second embodiment of the adsorption-type heat pump disclosed in the present specification. FIG. 8 is a diagram depicting the desorption process of the adsorption-type heat pump depicted in FIG. 7.

The adsorption-type heat pump 20 of the present embodiment includes only one adsorber 21c. Specifically, the adsorption-type heat pump 20 includes only the second adsorber and does not include the first adsorber in the first embodiment described above. Other structures of the adsorption-type heat pump 20 of the present embodiment are the same as those of the first embodiment described above.

An example of the operation of the adsorption-type heat pump 20 described above is illustrated below.

As a certain cycle, as depicted in FIG. 7, the adsorption process is performed in the adsorber 21c upon receipt of the supply of the refrigerant 24 evaporated from the evaporator 26. In the next cycle, as depicted in FIG. 8, the refrigerant 24 desorbed by performing the desorption process in the adsorber 21c is supplied to the condenser 25 and condensed therein. By repeating such cycles alternately, low-temperature heat is taken out from the adsorption-type heat pump 20 in the adsorption process.

Next, an information processing system including the adsorption-type heat pump depicted in FIG. 1 is illustrated below with reference to the drawings.

Figure 9:
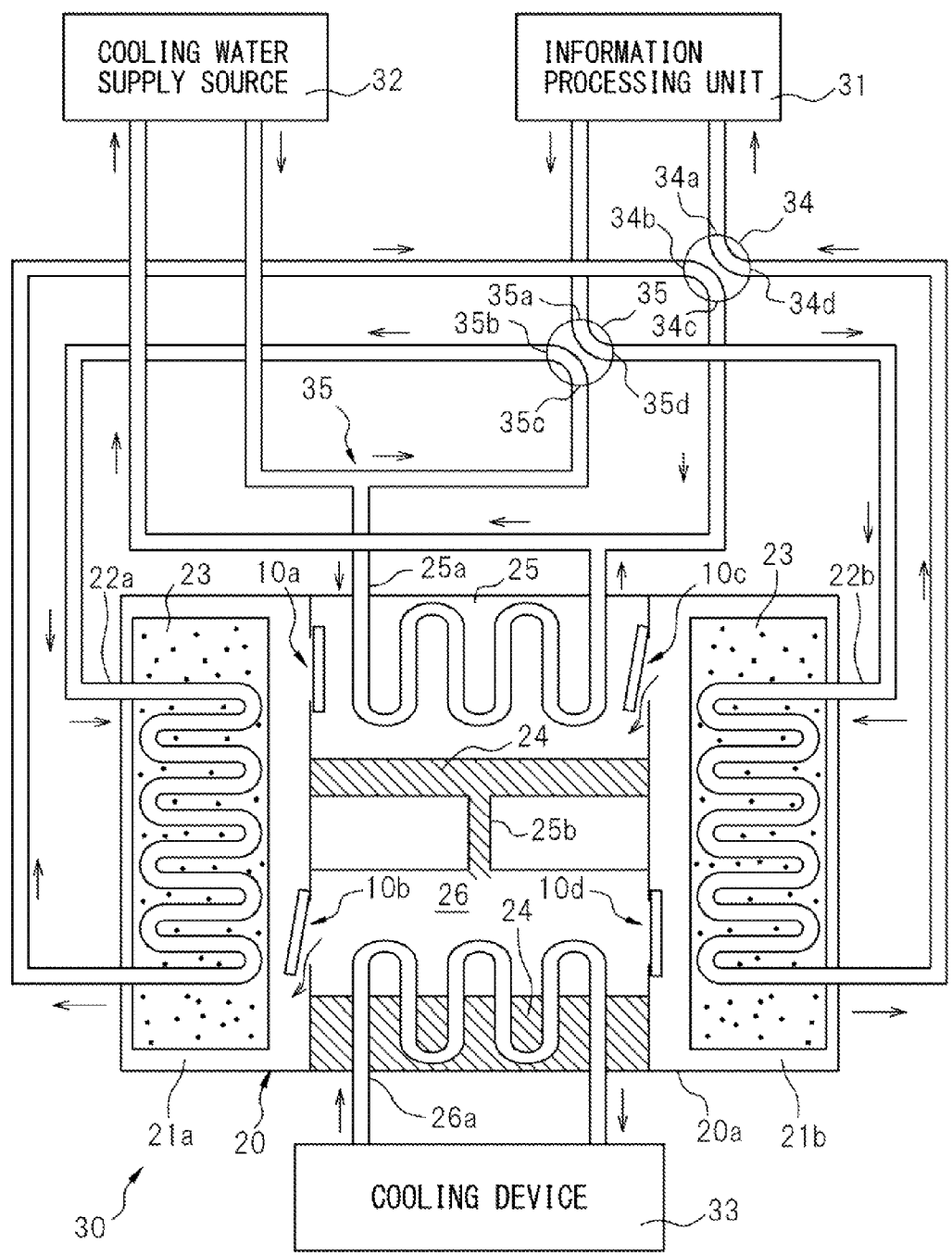
FIG. 9 is a diagram depicting an embodiment of an information processing system disclosed in the present specification.
Figure 10:
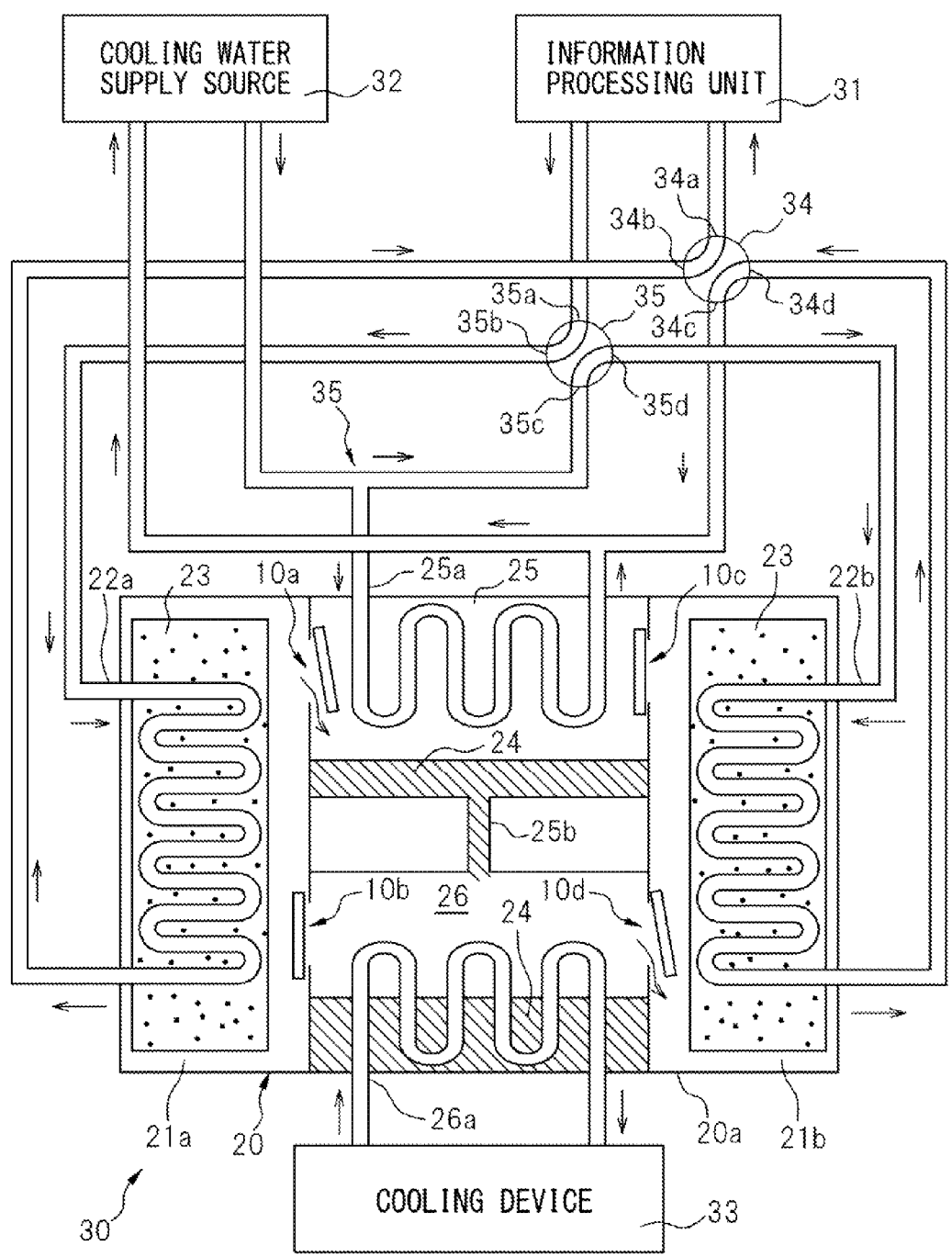
FIG. 10 is a diagram depicting a state where two four-way valves of the information processing system depicted in FIG. 9 are switched.
Figure 11:
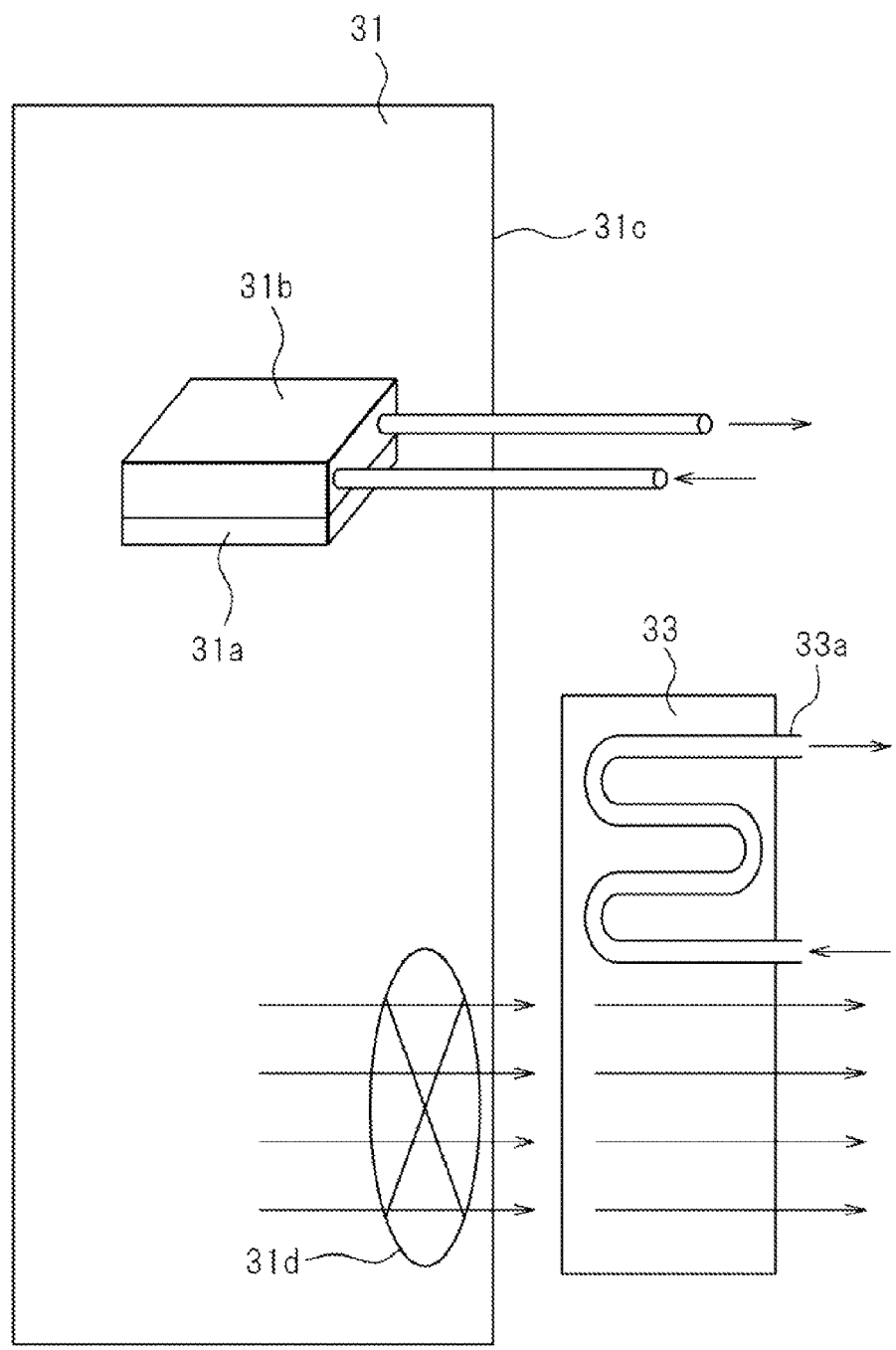
FIG. 11 is a diagram for illustrating an information processing unit and a cooling device of the information processing system depicted in FIG. 9 and FIG. 10.

FIG. 9 is a diagram depicting an embodiment of the information processing system disclosed in the present specification. FIG. 10 is a diagram depicting a state where two four-way valves of the information processing system depicted in FIG. 9 are switched. FIG. 11 is a diagram for illustrating an information processing unit and a cooling device of the information processing system in FIG. 9 and FIG. 10.

An information processing system 30 of the present embodiment includes an information processing unit 31 that produces heat at the time of operation and a cooling device 33 to which a first heating medium is supplied. Further, the information processing system 30 includes the adsorption-type heat pump 20 depicted in FIG. 1.

The first heating medium circulates between the evaporator 26 and the cooling device 33. The first heating medium returns to the cooling device 33 after it is supplied to the fourth heating medium pipe 26a of the evaporator 26 and cooled and low-temperature heat is taken out. It may also be possible for the cooling device 33 to, for example, take out low-temperature heat of the first heating medium using a heat exchanger to generate cold air, thereby cooling the information processing unit 31. Further, the cooling device 33 may be one for cooling a chamber in which the information processing device 31 is arranged.

The information processing unit 31 includes an arithmetic operation unit, such as a CPU, or a storage unit, such as a hard disk drive and produces heat at the time of operation. The information processing unit 31 may be, for example, a server etc. The information processing unit 31 heats a second heating medium using heat produced at the time of operation and supplies the high-temperature second heating medium to the adsorption-type heat pump 30. The high-temperature second heating medium is supplied at temperatures of, for example, 50 to 70° C.

For example, as depicted in FIG. 11, the information processing unit 31, which is a server, may include a CPU 31a, a cold plate 31b that comes into thermal contact with the CPU 31a, and a case 31c. The CPU 31a is cooled by transmitting produced heat to the cold plate 31b. The cold plate 31b heats the second heating medium using the transmitted heat and supplies the heated second heating medium to the adsorption-type heat pump 20.

As depicted in FIG. 11, the information processing unit 31, which is a server, may include a fan 31d which discharges air having high-temperature heat within the case 31c to the outside of the case. Outside the case 31c, a dry coil may be arranged as the cooling device 33 which takes in high-temperature air discharged from the fan 31d and discharges cooled low-temperature air. The cooling device 33 takes out low-temperature heat from the first heating medium supplied from the evaporator 26, cools high-temperature air discharged from the fan 31d, and discharges low-temperature air into the chamber in which the information processing unit 31 is arranged. The first heating medium heated by the dry coil 33 is returned to the evaporator 26.

To the adsorption-type heat pump 20, a low-temperature third heating medium is supplied from an external cooling water supply source 32. The cooling water supply source 32 may be a cooling tower of a utility device in a building which supplies cooling water. The low-temperature third heating medium is supplied at temperatures of, for example, 20 to 30° C.

The information processing system 30 includes a first four-way valve 34 and a second four-way valve 35 which switch flow passages of the high-temperature second heating medium and the low-temperature third heating medium. The first four-way valve 34 and the second four-way valve 35 may be controlled by the information processing unit 31. Further, it may also be possible to control the first four-way valve 34 and the second four-way valve 35 by a control unit different from the information processing unit 31.

The switching between the adsorption process and the desorption process for the first adsorber 21a and the second adsorber 21b is performed by the first four-way valve 34 and the second four-way valve 35 switching the flow passages of the high-temperature second heating medium and the low-temperature third heating medium.

Each of the first heating medium, the second heating medium, and the third heating medium circulates through the pipe by means of a pump, not depicted.

Next, an example of the operation of the information processing system 30 described above is illustrated below.

In the information processing system 30 depicted in FIG. 9, the first adsorber 21a is in the adsorption process and the second adsorber 21b is in the desorption process.

The high-temperature second heating medium supplied from the information processing unit 31 is supplied to the second heating medium pipe 22b of the second adsorber 21b through a port 35a to a port 35d of the second four-way valve 35. In the second adsorber 21b, the adsorbent 23 within the second adsorber 21b is heated and the desorption process is performed. The second heating medium after high-temperature heat is taken out in the second adsorber 21b returns to the information processing unit 31 through a port 34d to a port 34a of the first four-way valve 34. After being heated, the second heating medium having returned to the information processing unit 31 circulates again between the information processing unit 31 and the second adsorber 21b.

The low-temperature third heating medium supplied from the cooling water supply source 32 branches at a branch part 35 toward the condenser 25 and the first adsorber 21a.

The low-temperature third heating medium having branched toward the condenser 25 is supplied to the third heating medium pipe 25a. In the condenser 25, the refrigerant 24 in the gas phase supplied from the second adsorber 21b through the seat valve 10c is cooled by the low-temperature third heating medium and changes into the liquid phase. The refrigerant 24 having changed into the liquid phase is supplied to the evaporator 26. The third heating medium after low-temperature heat is taken out in the condenser 25 returns to the cooling water supply source 32.

On the other hand, the low-temperature third heating medium having branched toward the first adsorber 21a is supplied to the first heating medium pipe 22a of the first adsorber 21a through a port 35c to a port 35b of the second four-way valve 35. In the first adsorber 21a, the adsorbent 23 within the first adsorber 21a is cooled and the adsorption process is performed. The third heating medium after low-temperature heat is taken out in the first adsorber 21a returns to the cooling water supply source 32 through a port 34b to a port 34c of the first four-way valve 34. After being cooled outside, the third heating medium having returned to the cooling water supply source 32 is supplied again to the adsorption-type heat pump 20.

In the evaporator 26, the evaporated refrigerant 24 is supplied to the first adsorber 21a through the seat valve 10b by the inner pressure difference. In the evaporator 26, the heat of evaporation accompanying the change of the refrigerant 24 from the liquid phase into the gas phase is absorbed from the first heating medium flowing through the fourth heating medium pipe 26a and thus the first heating medium is cooled.

The cooled first heating medium is supplied to the cooling device 33 and low-temperature heat is taken out from the adsorption-type heat pump 20. As the low-temperature first heat medium, temperatures of, for example, 15 to 20° C. are obtained.

Next, a state where the first four-way valve 34 and the second four-way valve 35 are switched is illustrated.

In the information processing system 30 depicted in FIG. 10, the first adsorber 21a is in the desorption process and the second adsorber 21b is in the adsorption process.

The high-temperature second heating medium supplied from the information processing unit 31 is supplied to the first heating medium pipe 22a of the first adsorber 21a through the port 35a to the port 35b of the second four-way valve 35. In the first adsorber 21a, the adsorbent 23 within the first adsorber 21a is heated and the desorption process is performed. The second heating medium after high-temperature heat is taken out in the first adsorber 21a returns to the information processing unit 31 through the port 34b to the port 34a of the first four-way valve 34. After being heated, the second heating medium having returned to the information processing unit 31 circulates again between the information processing unit 31 and the first adsorber 21a.

The low-temperature third heating medium supplied from the cooling water supply source 32 branches at the branch part 35 toward the condenser 25 and the second adsorber 21b. The illustration of the low-temperature third heating medium having branched toward the condenser 25 is the same as in the case of FIG. 9.

On the other hand, the low-temperature third heating medium having branched toward the second adsorber 21b is supplied to the second heating medium pipe 22b of the second adsorber 21b through the port 35c to the port 35d of the second four-way valve 35. In the second adsorber 21b, the adsorbent 23 within the second adsorber 21b is cooled and the adsorption process is performed. The third heating medium after low-temperature heat is taken out in the second adsorber 21b returns to the cooling water supply source 32 through the port 34d to the port 34c of the first four-way valve 34. After being cooled outside, the third heating medium having returned to the cooling water supply source 32 is supplied again to the adsorption-type heat pump 20.

The illustration of the first heating medium which circulates between the evaporator 26 and the cooling device 33 is the same as in the case of FIG. 9.

As described above, in the information processing system 30, in the desorption process, the first adsorber 21a and the second adsorber 21b desorb the refrigerant 24 from the adsorbent 23 by using produced heat of the information processing unit 31. Further, in the information processing system 30, in the adsorption process, the evaporator 26 cools the first heating medium by utilizing the heat of evaporation when the refrigerant 24 is evaporated and supplies the cooled first heating medium to the cooling device 33.

According to the information processing system 30 of the present embodiment described above, it is possible to continuously take out low-temperature heat from the adsorption-type heat pump 20 by utilizing produced heat of the information processing unit 31 to operate the cooling device 33.

Then, the information processing system 30 includes the adsorption-type heat pump 20 with excellent heat exchange efficiency, and therefore, it is possible to perform cooling with high heat exchange efficiency.

In the present invention, the adsorption-type heat pump using the seat valve and the information processing system, the operation method of the adsorption-type heat pump, and the operation method of the information processing system of the embodiments described above may be changed appropriately as long as they do not deviate from the gist of the present invention. Further, it is possible to appropriately apply the component of one of the embodiments to the other embodiment.

For example, the adsorption-type heat pump may not have the heat conduction part. In this case, in the desorption process, by high-temperature heat of the refrigerant desorbed from the heated adsorbent, it is possible to deform the opening and closing assisting plate material. Similarly, in the adsorption process, by low-temperature heat of the evaporated refrigerant, it is possible to deform the opening and closing assisting plate material.

It may also be possible for the heat conduction part to have a heating wire which heats the opening and closing assisting plate material by heat produced by resistance and a Peltier element which cools the opening and closing assisting plate material in place of the pipe which causes the heating medium to flow.

Further, it may also be possible for the heat conduction part to have a heat pipe which transmits high-temperature heat or low-temperature heat of the heating medium to the opening and closing assisting plate material in place of the pipe which causes the heating medium to flow. In this case, high-temperature heat or low-temperature heat of the heating medium flowing through the pipe is transmitted to the opening and closing assisting plate material via the heat pipe.

It may also be possible for the first adsorber to have a heating wire which heats the adsorbent by heat produced by resistance and a Peltier element which cools the sorbent in place of the first heating medium pipe. Further, it may also be possible for the first adsorber to have a heat pipe which transmits high-temperature heat or low-temperature heat of the heating medium to the adsorbent in place of the first heating medium pipe. In this case, high-temperature heat or low-temperature heat of the heating medium caused to flow through the first heating medium pipe is transmitted to the adsorbent via the heat pump. The above is also applied to the second heating medium pipe of the second adsorber.

In the embodiments described above, the seat valve body is arranged on each of the first flow hole and the second flow hole, however, it is sufficient for the seat valve body to be arranged on at least one of the first flow hole and the second flow hole.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

10, 10a, 10b, 10c, 10d seat valve
11 seat material
12, 12a, 12b opening and closing assisting plate material
13 seat valve body
14, 14a, 14b fixing member
15, 15a, 15b pipe
16a first flow hole
16b second flow hole
16c third flow hole
16d fourth flow hole
17a first partition wall 17b second partition wall
17c third partition wall
17d fourth partition wall
20 adsorption-type heat pump
20a housing
21a first adsorber
21b second adsorber
21c adsorber
22a first heating medium pipe
22b second heating medium pipe
23 adsorbent
24 refrigerant
25 condenser
25a third heating medium pipe
25b conducting pipe
26 evaporator
26a fourth heating medium pipe
30 information processing system
31 information processing unit
32 cooling water supply source
33 cooling device (cooling unit)
34 first four-way valve
34a first port
34b second port
34c third port
34d fourth port
35 second four-way valve
35a first port
35b second port
35c third port
35d fourth port
35 branch part

The invention claimed is:

1. An adsorption-type heat pump comprising:
an adsorber having an adsorbent and capable of switching between an adsorption process of causing an adsorbent to adsorb a refrigerant and a desorption process of desorbing the refrigerant from an adsorbent;
a condenser which condenses the refrigerant desorbed from the adsorber;
an evaporator which evaporates the refrigerant supplied from the condenser and supplies the evaporated refrigerant to the adsorber;
a first flow hole which causes the refrigerant to flow from the adsorber to the condenser;
a second flow hole which causes the refrigerant to flow from the evaporator to the adsorber;
a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole; and
a heat conduction part which conducts heat to the opening and closing assisting plate material, wherein
the heat conduction part has a pipe which causes a heating medium to flow and which is capable of conducting heat to the opening and closing assisting plate material, and
as the heating medium, a heating medium for cooling an adsorbent in the adsorption process or a heating medium for heating an adsorbent in the desorption process is used.

2. The adsorption-type heat pump according to claim 1, comprising the two seat valve bodies, wherein
one of the seat valve bodies is arranged on the first flow hole and the other seat valve body is arranged on the second flow hole, and
the direction of deformation in accordance with temperature of the opening and closing assisting plate material of the one seat valve body is opposite to that of the opening and closing assisting plate material of the other seat valve body.

3. The adsorption-type heat pump according to claim 1, wherein
one end part of the opening and closing assisting plate material is joined to the seat material, and
the other end part of the opening and closing assisting plate material is fixed on the periphery of at least one of the first flow hole and the second flow hole on which the seat valve body is arranged.

4. The adsorption-type heat pump according to claim 1, wherein
the heat conduction part has a fixing member which fixes the opening and closing assisting plate material on the periphery of at least one of the first flow hole and the second flow hole on which the seat valve body is arranged, and
inside the fixing member, the pipe is arranged and the pipe and the opening and closing assisting plate material are thermally coupled via the fixing member.

5. The adsorption-type heat pump according to claim 1, wherein
the opening and closing assisting plate material is formed by stacking a plurality of plate materials having different thermal expansion coefficients.

6. The adsorption-type heat pump according to claim 1, wherein
the seat valve body comprises the two opening and closing assisting plate materials,
one end part of the seat material is joined to one of the opening and closing assisting plate materials and the other end part of the seat material is joined to the other opening and closing assisting plate material, and
a length of the portion of the seat material located between the one opening and closing assisting plate material and the other opening and closing assisting plate material is greater than a distance between the one opening and closing assisting plate material and the other opening and closing assisting plate material.

7. An information processing system comprising:
an information processing unit which produces heat at the time of operation;
a cooling unit to which a heating medium is supplied; and
an adsorption-type heat pump having:
an adsorber having an adsorbent and capable of switching between an adsorption process of causing an adsorbent to adsorb a refrigerant and a desorption process of desorbing the refrigerant from an adsorbent;
a condenser which condenses the refrigerant desorbed from the adsorber;
an evaporator which evaporates the refrigerant supplied from the condenser and supplies the evaporated refrigerant to the adsorber;
a first flow hole which causes the refrigerant to flow from the adsorber to the condenser;
a second flow hole which causes the refrigerant to flow from the evaporator to the adsorber;
a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole; and a heat conduction part which conducts heat to the opening and closing assisting plate material, wherein the heat conduction part has a pipe which causes a heating medium to flow and which is capable of conducting heat to the opening and closing assisting plate material, and as the heating medium, a heating medium for cooling an adsorbent in the adsorption process or a heating medium for heating an adsorbent in the desorption process is used, wherein in the desorption process, the adsorber desorbs the refrigerant from an adsorbent by using produced heat of the information processing unit, and in the adsorption process, the evaporator cools the heating medium by using heat of evaporation when the refrigerant is evaporated and supplies the cooled heating medium to the cooling unit.

8. An operation method of an adsorption-type heat pump, the adsorption-type heat pump comprising:

an adsorber having an adsorbent and capable of switching between an adsorption process of causing an adsorbent to adsorb a refrigerant and a desorption process of desorbing the refrigerant from an adsorbent;

a condenser which condenses the refrigerant desorbed from the adsorber;

an evaporator which evaporates the refrigerant supplied from the condenser;

a first flow hole which causes the refrigerant to flow from the adsorber to the condenser;

a second flow hole which causes the refrigerant to flow from the evaporator to the adsorber;

a seat valve body arranged on at least one of the first flow hole and the second flow hole, having a seat material and an opening and closing assisting plate material joined to an end part of the seat material and formed by a temperature-dependent material which deforms in accordance with temperature, and opening and closing at least one of the first flow hole and the second flow hole; and a heat conduction part which conducts heat to the opening and closing assisting plate material, wherein the heat conduction part has a pipe which causes a heating medium to flow and which is capable of conducting heat to the opening and closing assisting plate material, and as the heating medium, a heating medium for cooling an adsorbent in the adsorption process or a heating medium for heating an adsorbent in the desorption process is used, wherein in the desorption process, the adsorber supplies the refrigerant desorbed from an adsorbent to the condenser through the first flow hole, and in the adsorption process, the evaporator supplies the evaporated refrigerant to the adsorber through the second flow hole.

9. The operation method of an adsorption-type heat pump according to claim 8, wherein the adsorption-type heat pump comprises the two seat valve bodies, one of the seat valve bodies is arranged on the first flow hole and the other seat valve body is arranged on the second flow hole, and the opening and closing assisting plate material of the one seat valve body and the opening and closing assisting plate material of the other seat valve body are deformed in accordance with temperature in opposite directions.

* * * * *